US008881002B2

(12) United States Patent
Veselov et al.

(10) Patent No.: US 8,881,002 B2
(45) Date of Patent: Nov. 4, 2014

(54) TRIAL BASED MULTI-COLUMN BALANCING

(75) Inventors: Evgeny N. Veselov, Sammamish, WA (US); Peter G. Salas, Kirkland, WA (US); Phillip F. Cupp, Sammamish, WA (US); Michael Jacob Jolson, Seattle, WA (US); Markus W. Mielke, Redmond, WA (US); Veljko Miljanic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 55 days.

(21) Appl. No.: 13/233,408

(22) Filed: Sep. 15, 2011

(65) Prior Publication Data

US 2013/0073943 A1 Mar. 21, 2013

(51) Int. Cl.
*G06F 17/00* (2006.01)
*G06F 17/21* (2006.01)

(52) U.S. Cl.
CPC .................................. *G06F 17/212* (2013.01)
USPC ............................ 715/243; 715/246; 715/247

(58) Field of Classification Search
USPC .......................................... 715/243, 246, 247
See application file for complete search history.

(56) References Cited

U.S. PATENT DOCUMENTS

| | | | |
|---|---|---|---|
| 4,891,771 A | 1/1990 | Edel et al. | |
| 5,557,722 A | 9/1996 | DeRose et al. | |
| 5,633,996 A | 5/1997 | Hayashi et al. | |
| 5,784,487 A | 7/1998 | Cooperman | |
| 5,926,825 A | 7/1999 | Shirakawa | |
| 6,374,273 B1 | 4/2002 | Webster | |
| 6,763,388 B1 * | 7/2004 | Tsimelzon | 709/228 |
| 7,246,306 B2 | 7/2007 | Chen et al. | |
| 7,337,392 B2 | 2/2008 | Lue | |
| 7,353,452 B2 | 4/2008 | Boehme et al. | |
| 7,415,452 B1 | 8/2008 | Ayers | |
| 2001/0032216 A1 | 10/2001 | Duxbury | |
| 2002/0073125 A1 | 6/2002 | Bier | |
| 2002/0156815 A1 | 10/2002 | Davia | |
| 2004/0006742 A1 | 1/2004 | Slocombe | |
| 2004/0148571 A1 | 7/2004 | Lue | |

(Continued)

OTHER PUBLICATIONS

"Final Office Action", U.S. Appl. No. 12/732,075, (Aug. 27, 2012), 16 pages.

(Continued)

*Primary Examiner* — Stephen Hong
*Assistant Examiner* — Matthew Ludwig
(74) *Attorney, Agent, or Firm* — Andrew Sanders; Micky Minhas; Wolfe-SBMC

(57) ABSTRACT

A trial based layout builder generates multiple trial multi-column layouts for content until a multi-column layout that satisfies particular criteria for multi-column balancing is generated. Multiple trial multi-column layouts can be generated in parallel based on different boundaries until a layout that does satisfy the criteria is identified. Different elements of the content laid out in different trial multi-column layouts can be reused in subsequently generated trial multi-column layouts. The content can also optionally be separated into multiple different portions at various break points, and trial multi-column layouts for the different portions can be generated in parallel. Additionally, if a trial multi-column layout for one of the portions that satisfies the particular criteria is identified, the content in that portion can be displayed while continuing to attempt to identify a layout for the content of the other portion that satisfies the one or more criteria.

20 Claims, 6 Drawing Sheets

(56) References Cited

U.S. PATENT DOCUMENTS

| | | |
|---|---|---|
| 2005/0264847 A1 | 12/2005 | Suzuki |
| 2006/0041556 A1 | 2/2006 | Taniguchi et al. |
| 2006/0092454 A1 | 5/2006 | Narusawa et al. |
| 2006/0136811 A1 | 6/2006 | Burago et al. |
| 2007/0083730 A1 | 4/2007 | Vorbach et al. |
| 2007/0220423 A1 | 9/2007 | Charbonneau et al. |
| 2008/0022197 A1 | 1/2008 | Bargeron et al. |
| 2008/0109477 A1 | 5/2008 | Lue |
| 2008/0201697 A1 | 8/2008 | Matsa et al. |
| 2008/0301545 A1 | 12/2008 | Zhang et al. |
| 2008/0307047 A1 | 12/2008 | Jowett et al. |
| 2009/0070413 A1 | 3/2009 | Priyadarshan et al. |
| 2009/0182941 A1 | 7/2009 | Turk |
| 2009/0192941 A1 | 7/2009 | Fournier et al. |
| 2009/0228782 A1 | 9/2009 | Fraser |
| 2011/0153604 A1 | 6/2011 | Yu et al. |
| 2011/0239105 A1 | 9/2011 | Veselov |
| 2011/0239106 A1 | 9/2011 | Veselov |

OTHER PUBLICATIONS

"Non-Final Office Action", U.S. Appl. No. 12/732,088, (Oct. 25, 2012), 23 pages.

"Final Office Action", U.S. Appl. No. 12/732,088, (Apr. 16, 2012), 22 pages.

"Non-Final Office Action", U.S. Appl. No. 12/732,075, (Apr. 25, 2012), 13 pages.

Johnson, R. B., "Understanding smeared documents", Retrieved at <<http://ieeexplore.ieee.org/stamp/stamp.jsp?tp=&arnumber=773123>>, IEE Colloquium on Document Image Processing and Multimedia (Ref. No. 1999/041), 1999, pp. 2/1-2/6.

"Sequential Layout Builder Architecture", U.S. Appl. No. 12/732,075, filed Mar. 25, 2010, pp. 39.

"CSS Multi-column Layout Module", Retrieved at <<http://www.w3.org/TR/2011/CR-css3-multicol-20110412/>>W3C Candidate Recommendation, Apr. 12, 2011, pp. 19.

"Components—Official Grok v1.0 Documentation", Retrieved from: <http://grok.zope.org/doc/current/reference/components.html> on Mar. 5, 2010, (Sep. 17, 2009), 27 pages.

"Non-Final Office Action", U.S. Appl. No. 12/732,088, (Dec. 27, 2011), 19 pages.

"PCT Search Report and Written Opinion", Application No. PCT/US2011/029745, (Nov. 28, 2011), 8 pages.

"PCT Search Report and Written Opinion", Application No. PCT/US2011/029722, (Nov. 30, 2011), 8 pages.

Andrews, Anneliese A., et al., "Testing Web Applications by Modeling with FSMs", *Journal of Software and Systems Modeling*, Available at <http://citeseerx.ist.psu.edu/viewdoc/download?doi=10.1.1.90.8011&rep=rep1&type=pdf>, (Jan. 25, 2005), pp. 1-28.

Meyerovich, Leo A., et al., "Fast and Parallel Webpage Layout", *WWW 2010*, Available at <http://www.eecs.berkeley.edu/~lmeyerov/projects/pbrowser/pubfiles/tr.pdf>, (Apr. 2010), 16 pages.

"Final Office Action", U.S. Appl. No. 12/732,088, (May 15, 2013), 26 pages.

"Foreign Office Action", Chinese Application No. 201180015838.2, (May 24, 2013), 4 Pages.

"Non-Final Office Action", U.S. Appl. No. 12/732,075, (Sep. 10, 2013), 14 pages.

"Non-Final Office Action", U.S. Appl. No. 12/732,088, (Sep. 19, 2013), 22 pages.

"Foreign Office Action", CN Application No. 201180015838.2, Nov. 22, 2013, 11 Pages.

"Final Office Action", U.S. Appl. No. 12/732,075, Nov. 25, 2013, 17 pages.

"Notice of Allowance", U.S. Appl. No. 12/732,088, Jun. 10, 2014, 6 pages.

"Non-Final Office Action", U.S. Appl. No. 12/732,075, May 9, 2014, 17 pages.

"Decision to Grant", CN Application No. 201180015838.2, Mar. 28, 2014, 3 Pages.

* cited by examiner

TRIAL BASED MULTI-COLUMN BALANCING

BACKGROUND

Rendering structured Web content, such as HyperText Markup Language (HTML) and Cascading Style Sheet (CSS) content using a Web browser, typically involves processing a structured document including markup to ascertain the layout of the content so that it can be presented by the Web browser. However, due to the many different fonts, characters, symbols, and so forth that can be displayed, as well as the different sizes for such fonts, characters, symbols, and so forth, it can be difficult to obtain a well-balanced layout of the content if displaying the content across multiple columns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, content to be displayed in a multi-column layout in an area having boundaries is identified. The content includes multiple elements, and for each of at least one of the multiple elements, an element layout generated for a previous trial multi-column layout of the content is obtained. A trial multi-column layout for the content based at least in part on the boundaries and the obtained at least one element layout is generated, and a check made as to whether the trial multi-column layout satisfies one or more criteria. If the trial multi-column layout satisfies the one or more criteria, then the trial multi-column layout is used for displaying the content. However, if the trial multi-column layout does not satisfy the one or more criteria, then the obtaining, generating, and checking are repeated with areas having boundaries.

In accordance with one or more aspects, content including multiple elements to be displayed in a multi-column layout in an area is identified. A first trial multi-column layout for the content is generated based at least in part on first boundaries in parallel with generation of a second trial multi-column layout for the content based at least in part on second boundaries. These first and second boundaries are different sets of boundaries, and a check is made as to whether the first trial multi-column layout or the second trial multi-column layout satisfies one or more criteria. If the first trial multi-column layout or second trial multi-column layout satisfies the one or more criteria, then the one of the first trial multi-column layout or the second trial multi-column layout that satisfies the one or more criteria is used to display the content. However, if neither the first trial multi-column layout nor the second trial multi-column layout satisfies the one or more criteria, then the generating and checking are repeated with different boundaries.

BRIEF DESCRIPTION OF THE DRAWINGS

The same numbers are used throughout the drawings to reference like features.

DETAILED DESCRIPTION

Trial based multi-column balancing is discussed herein. A controller coordinates multiple different layout generation modules each of which attempts to generate a multi-column layout for content that satisfies one or more criteria in an area having particular boundaries. This criteria can be, for example, that the content does not overflow the particular boundaries and does not underflow the particular boundaries by more than a threshold amount. These different layout generation modules can run in parallel generating different trial layouts based on different boundaries concurrently until a layout that does satisfy the one or more criteria is identified. Different elements of the content laid out in different trial layouts can also be reused in subsequently generated trial layouts, reducing the amount of time taken to subsequently generate the trial layouts. The content can also optionally be separated into multiple different portions at various break points, and trial layouts for the different portions can be generated in parallel. Additionally, if a trial layout for one of the portions that satisfies the one or more criteria is identified, the content in that portion can be displayed while continuing to attempt to identify a layout for the content of the other portion that satisfies the one or more criteria.

Figure 1:
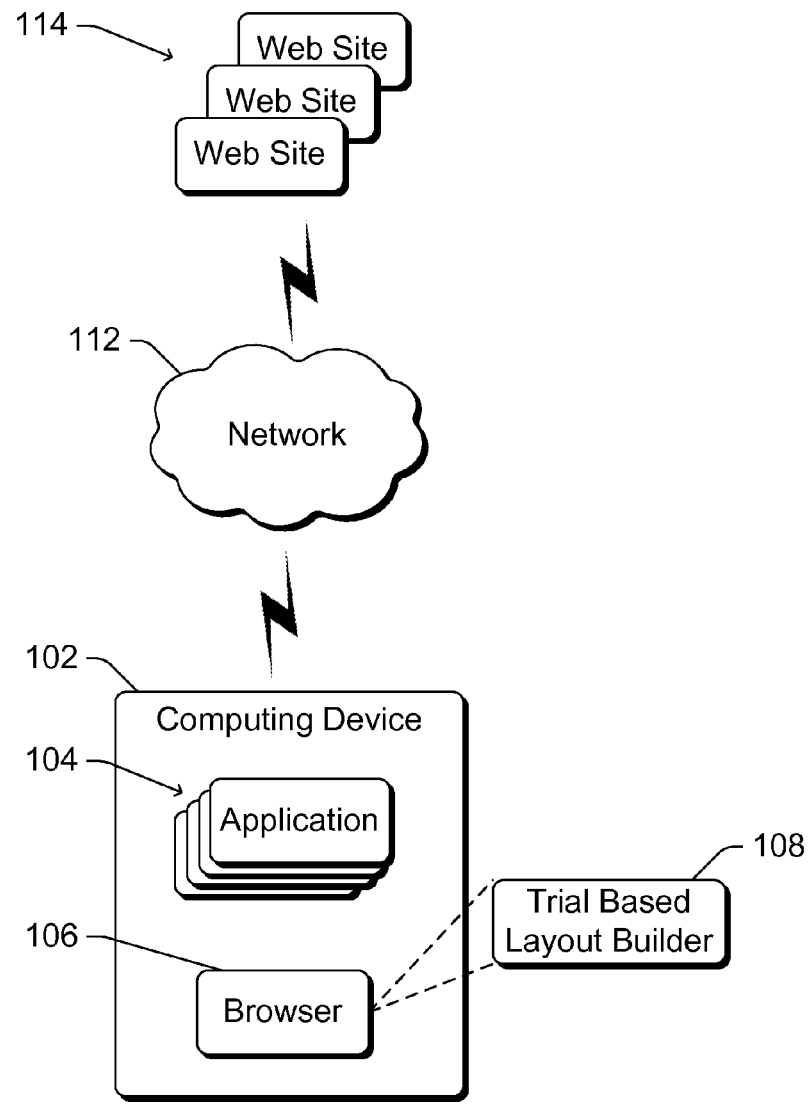
FIG. 1 illustrates an example system implementing the trial based multi-column balancing in accordance with one or more embodiments.

FIG. 1 illustrates an example system 100 implementing the trial based multi-column balancing in accordance with one or more embodiments. System 100 includes a computing device 102, which can be a variety of different types of devices, such as a physical device or a virtual device. For example, computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 102 can also be a virtual device, such as a virtual machine running on a physical device. A virtual machine can be run on any of a variety of different types of physical devices (e.g., any of the various types listed above). Thus, computing device 102 may range from a full resource device with substantial memory and processor resources (e.g., personal computers, game consoles) to a low-resource device with limited memory and/or processing resources (e.g., traditional set-top boxes, handheld game consoles).

Computing device 102 also includes one or more applications 104 and a Web browser 106. Web browser 106 can be any suitable Web browser, such as the Internet Explorer® Web browser available from Microsoft Corporation of Redmond, Wash. In addition, computing device 102 includes a trial based layout builder 108. Trial based layout builder 108 can be implemented as a standalone component that can be utilized by applications 104 and Web browser 106. Alternatively or additionally, trial based layout builder 108 can be implemented as part of applications 108 and/or Web browser 106.

In operation, trial based layout builder 108 allows for various trial layouts to be generated, each having different boundaries for an area including multiple columns of content. A trial layout refers to a layout that is generated in an attempt to generate a multi-column layout that satisfies one or more criteria for balancing the content across multiple columns. Various trial layouts are generated until a layout is generated that satisfies one or more criteria for balancing the content across multiple columns. A trial layout that satisfies the one or more criteria for balancing the content across multiple columns is also referred to as a balanced layout. Trial based layout builder 108 employs, for each trial, the use of a layout builder to oversee the process of layout processing for the trial, box builder types that are knowledgeable of their own requirements for content processing, and associated layout boxes that are built or generated by instances of the box builder types and which hold data that for the trial layout (and which will ultimately be rendered on a display or screen if the trial layout satisfies the one or more criteria for balancing the content across multiple columns).

In addition, system 100 includes a network 112 and one or more web sites 114 from which content can be received and/or to which content can be sent. Such content can include structured documents such as HTML documents and other web content that can be operated upon by trial based layout builder 108. Network 112 can be a variety of different networks, including the Internet, a local area network (LAN), a public telephone network, an intranet, other public and/or proprietary networks, combinations thereof, and so forth. Web sites 114 can be implemented by a one or more computing devices that, similar to the discussion of computing device 102, can be a variety of different types of devices, ranging from full resource devices with substantial memory and processor resources to low-resource devices with limited memory and/or processing resources.

Figure 2:
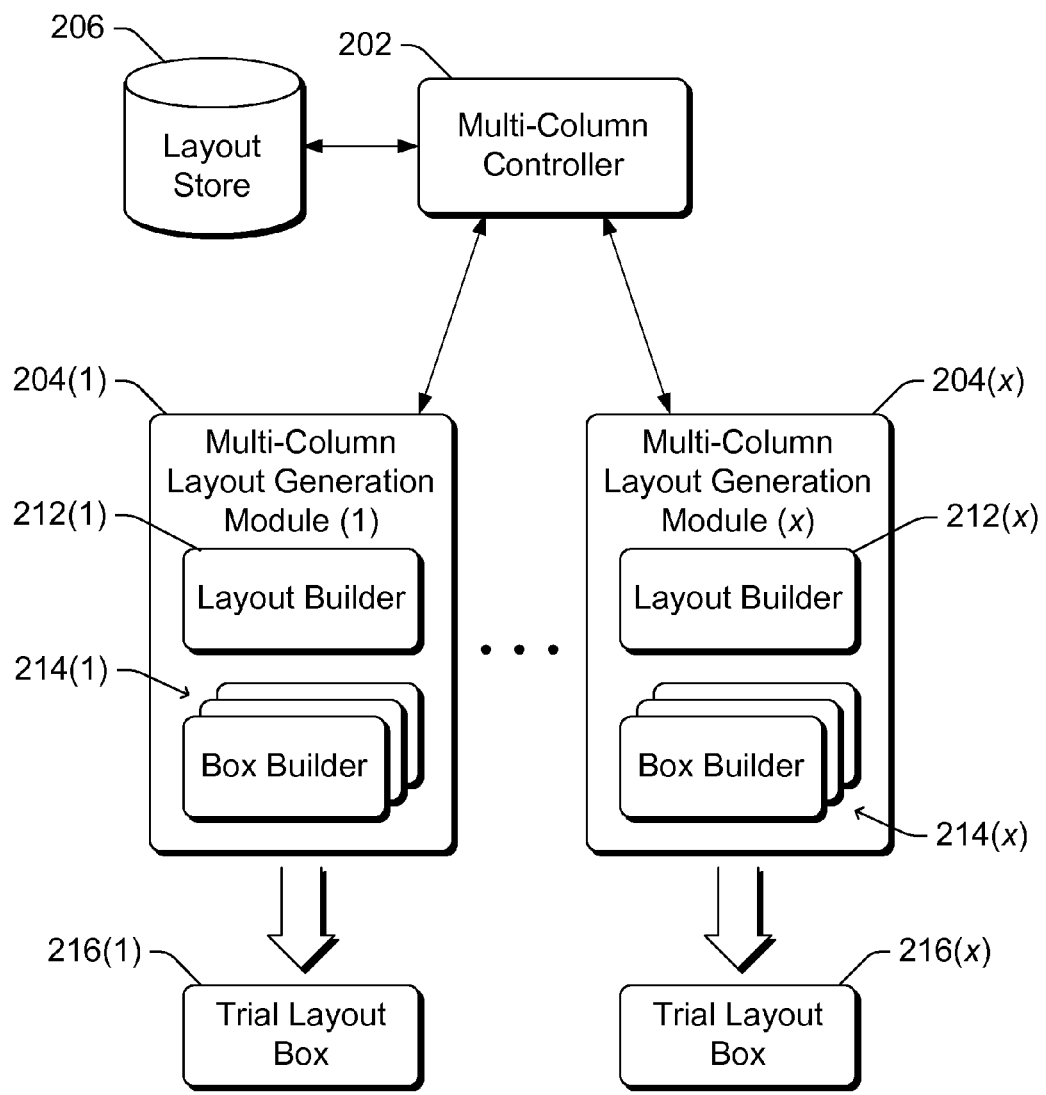
FIG. 2 illustrates an example trial based layout builder in accordance with one or more embodiments.

FIG. 2 illustrates an example trial based layout builder 200 in accordance with one or more embodiments. Trial based layout builder 200 can be, for example, a trial based layout builder of 108 of FIG. 1. Trial based layout builder 200 includes a multi-column layout controller 202, multiple multi-column layout generation modules 204(1), . . . , 204(x), and a layout store 206. Multi-column controller 202 oversees or organizes the generation of trial layouts by multi-column layout generation modules 204, creating or activating modules 204 as controller 202 sees fit. Each multi-column layout generation module 204 uses a different boundary for an area in which the module 204 generates a multi-column layout. Each layout generated by a multi-column layout generation module 204 is a trial layout, and multi-column controller 202 evaluates the trial layouts to identify a trial layout that satisfies one or more criteria for multi-column balancing. In response to identifying a trial layout that satisfies the one or more criteria, which is referred to as a balanced layout, multi-column controller 202 provides the balanced layout to a renderer for display.

Multi-column controller 202 can use various criteria for multi-column balancing. Generally, multi-column balancing refers to content being spread across multiple columns with a balanced look, so that the content in each column is approximately at the bottom of the column. In one or more embodiments, the multi-column balancing refers to the content not overflowing (not exceeding) the area in which the content is being displayed and not underflowing (not leaving too much empty space until the end of) one or more of the multiple columns by more than a threshold amount.

Figure 3:
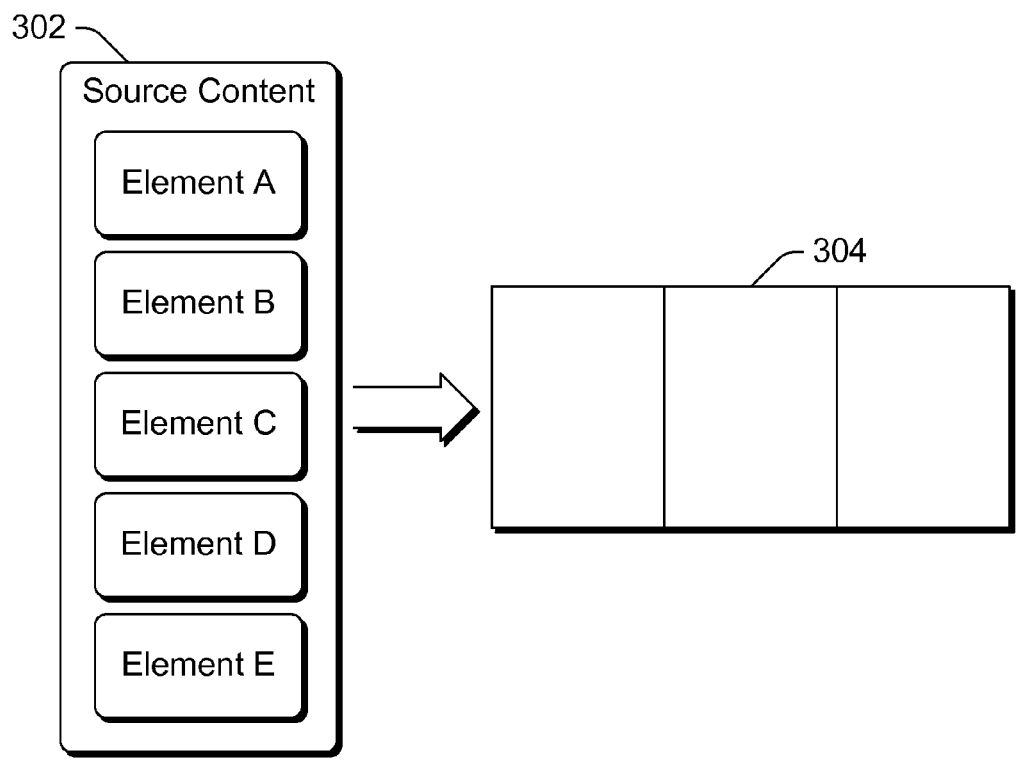
FIG. 3 illustrates an example of source content and a multi-column layout in accordance with one or more embodiments.

FIG. 3 illustrates an example of source content and a multi-column layout in accordance with one or more embodiments. Source content 302 is a structured document, such as an HTML document, that can include multiple parts referred to as elements. For example, source content 302 includes an element A, an element B, an element C, an element D, and an element E. Elements can be different types of content or data (e.g., text can be an element, an image can be an element, etc.) or can include the same types of content or data (e.g., text with the same or different fonts or font sizes). Source content 302 identifies the different elements included in source content 302, and can identify the elements in different manners, such as based on particular tags in an HTML document or other identifiers in source content 302 or in metadata associated with source content 302. Source content 302 also includes indications of which elements of source content 302 are to be spread across multiple columns (e.g., using tags or other identifiers included in source content 302 or in metadata associated with source content 302). Trial based layout builder 200 generates one or more trial layouts 304 that are multi-column layouts. Although the multi-column layout in FIG. 3 is illustrated as having three columns, it should be noted that the multi-column layout can have any number of columns.

Figure 4:
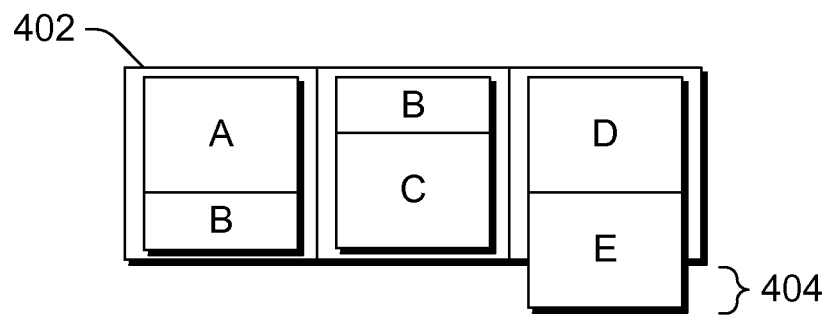
FIGS. 4, 5, and 6 illustrate example multi-column layouts of content being displayed in three columns.
Figure 5:
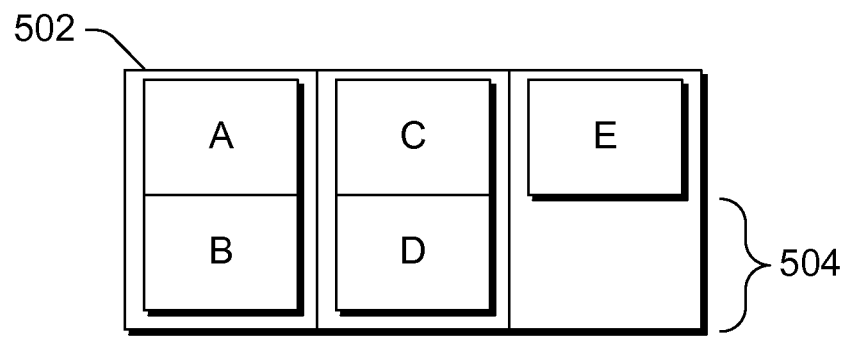
Figure 6:
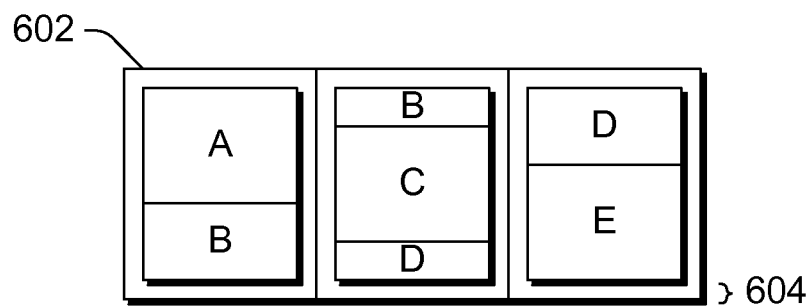

FIGS. 4, 5, and 6 illustrate example multi-column layouts of content being displayed in three columns. The content being displayed in FIGS. 4, 5, and 6 is illustrated as multiple element layouts: element layout A, element layout B, element layout C, element layout D, and element layout E. Each element layout refers to a layout of an element of the source content that is to be included in the multi-column layout. FIG. 4 illustrates a multi-column layout with the content overflowing the area in which the content is being displayed. Given the boundaries of an area 402, a portion 404 of element layout E does not fit within the area in which the content is being displayed and thus is referred to as overflowing the area.

FIG. 5 illustrates a multi-column layout with the content underflowing the area in which the content is being displayed. Given the boundaries of an area 502, a portion 504 of the last of the three columns includes no content. If this portion 504 is greater than a threshold amount (e.g., has a height greater than a threshold number of pixels), then the content is referred to as underflowing the area.

FIG. 6 illustrates a balanced multi-column layout. Given the boundaries of an area 602, a portion 604 of the last of the three columns includes no content. If this portion is less than a threshold amount, then the content is referred to as being balanced (and is neither underflowing nor overflowing).

Returning to FIG. 2, multi-column controller 202 oversees or organizes the generation of trial layouts by multi-column layout generation modules 204. The number of columns in the trial layouts can be determined in different manners, such as being specified as a column count in the source content, being specified as a column width in the source content (which can be divided into a width of a window in which the source content is to be displayed in order to determine how many columns of that width can be displayed), and so forth.

For a trial layout, a multi-column layout generation module 204 builds a display tree of layout boxes that contain content or data, such as text, images, or graphical elements such as scalable vector graphics (Svg) elements that are to be rendered on a screen or display for the trial layout. Particular boundaries of an area in which the layout boxes are to be displayed using multiple columns for a particular trial layout are provided by multi-column controller 202 to the multi-column layout generation module 204 generating the trial layout. The boundaries are typically a height and width of an area (e.g., in pixels) in which the multi-column layout is displayed. Multi-column controller 202 can change these boundaries, providing different boundaries to different multi-column layout generation modules 204. Multi-column controller 202 typically changes the height of the boundaries provided to different multi-column layout generation modules 204, although multi-column controller 202 can alternatively change the width (or both width and height) of the boundaries provided to different multi-column layout generation modules 204.

Each multi-column layout generation module 204 includes a layout builder 212 and one or more box builders 214, and generates a trial layout box 216. Layout builder 212 constitutes the layout engine or object that oversees or organizes the processing for a particular trial layout. Layout builder 212 is responsible for instantiating trial layout box 216, and then communicating with one or more box builders 214 to see that the trial layout box 216 is populated with content for the trial layout. Each box builder 214 is an object that is responsible for building a particular type of element layout within layout box 216. Each element layout can be made up of one or more line boxes. For example, element layout A in FIG. 5 is illustrated in a single line box in a single column, and element layout B is illustrated as two line boxes each in one of two different columns. Specifically, there are different types of box builders, such as box builders for building tables, images, multicolor, lines, and the like. The box builders are specifically configured to build a particular type of content. As will be appreciated by the skilled artisan, different types of content have different layout requirements. Each different type of box builder is knowledgeable of the different layout requirements for its associated content type, and can build a corresponding piece of content. In one or more embodiments, box builder 214 is an abstract class that represents common properties and methods of these different types of builders, and thus defines the general contract of box building.

Multi-column controller 202 receives source content, such as an HTML document, and creates or activates one or more multi-column layout generation modules 204 to generate trial layouts. The layout builder 212 receives the source content and sequentially moves through the source content, communicating with one or more box builders 214 which, in turn, populate the trial layout box 216 with its content. The trial layout boxes 216 are also referred to as trial layouts generated by multi-column layout generation modules 204. Each trial layout box 216 has a particular area, defined by particular boundaries, in which content is displayed in multiple columns. Depending on the boundaries of the trial layout box 216, the content of trial layout box 216 may underflow or overflow this area as discussed above. A result value is also generated by each multi-column layout generation module 204, the result value indicating whether the content of trial layout box 216 underflowed or overflowed the area for the trial layout box 216, and if so by how much (e.g., a number of pixels) by which the content underflowed or overflowed the area.

Multi-column controller 202 can determine the initial boundaries to provide to multi-column layout generation modules 204 in a variety of different manners. For example, multi-column controller 202 can invoke an estimator that can generate a single-column layout for the content and identify a height (e.g., in pixels) of the single-column layout given a particular width of an area. This height can be divided by the number of columns in the multi-column layout, and the resulting value used by multi-column controller 202 as the height for the initial boundaries of the area. The resulting value can also be increased and/or decreased by a particular amount (e.g., by 5% or 10%), and controller 202 can create or activate multiple multi-column layout generation modules 204 in parallel as discussed in more detail below, providing one with the resulting value, providing one or more other modules 204 with the resulting value increased by some amount (e.g., 5% or 10%), and/or providing one or more other modules 204 with the resulting value decreased by some amount (e.g., 5% or 10%).

By way of another example, multi-column controller 202 can maintain a record of previously generated balanced multi-column layouts for content (e.g., if the source content was previously received from a web site 114 of FIG. 1), such as a record of the boundaries of the area in which the balanced multi-column layout was displayed. If a record of a previous balanced multi-column layout for the content is available, multi-column controller 202 can use the boundaries of that previous balanced multi-column layout for the content as the initial boundaries to provide to a multi-column layout generation module 204. The boundaries of that previous balanced multi-column layout can also be increased and/or decreased by particular amounts (e.g., by 5% or 10%), and controller 202 can create or activate multiple multi-column layout generation modules 204 in parallel as discussed in more detail below, providing one with the boundaries of the previous balanced multi-column layout, providing one or more other modules 204 with the boundaries of that previous balanced multi-column layout increased by some amount (e.g., 5% or 10%), and/or providing one or more other modules 204 with the boundaries of that previous balanced multi-column layout decreased by some amount (e.g., 5% or 10%).

One or more trial layout boxes 216 that are populated by a multi-column layout generation module 204 are also maintained in layout store 206, even though the trial layout boxes 216 may not have been rendered. The layout of different elements within trial layout boxes 216 stored in layout store 206 can be used by multi-column layout generation modules 204 in generating subsequent trial layouts as discussed in more detail below. The number of trial layout boxes maintained in layout store 206 can be determined in different manners, such as keeping a threshold number of most recently generated trial layout boxes, allocating a particular amount of storage space and keeping as many most recently generated trial layout boxes as will fit in the particular amount of storage space, and so forth.

Various different techniques are employed by multi-column controller 202 and/or multi-column layout generation modules 204 in generating trial layout boxes 216. These techniques can include using parallelization, reusing element layouts, fragmenting layouts, and/or rendering partial layouts, and are discussed in more detail below. All of these techniques can be used together, individual ones of these techniques can be used, or various combinations of these techniques can be used.

Parallelization refers to running multiple multi-column layout generation modules 204 in parallel. Multiple multi-column layout generation modules 204 running in parallel refers to the multiple modules 204 running concurrently. Such modules 204 can be executed concurrently (e.g., on different processors or processor cores) or can execute at different times (e.g., being time-multiplexed on a processor or processor core). Running multiple multi-column layout generation modules 204 in parallel allows trial layout boxes 216 for areas with different boundaries to be generated concurrently. Multi-column controller 202 can determine how many multi-column layout generation modules 204 to run in parallel in various manners, such as based on a number of processors and/or processor cores in a device implementing a layout builder 200 (e.g., one multi-column layout generation module for each processor and/or processor core), based on a number of different boundaries for which controller 202 desires to have trial layouts generated, and so forth.

Multi-column controller 202 maintains a record of the boundaries that were used by each multi-column layout generation module 204 in generating a trial layout box 216, as well as a result indicating why the trial layout box 216 did not satisfy the one or more criteria. For example, if the content underflowed (or overflowed) the area of a trial layout box 216 having particular boundaries, then multi-column controller 202 maintains a result indicating that the content underflowed (or overflowed) the area with those particular boundaries and by how much (e.g., how many rows of pixels) the content underflowed (or overflowed) the area.

Multi-column controller 202 can use these results in determining boundaries for subsequent multi-column layout generation modules 204. For example, assume the content underflows the area of a trial layout box 216 having boundaries indicating a height of 190 pixels, but overflows the area of a trial layout box 216 having boundaries indicating a height of 170 pixels. Multi-column controller 202 can readily determine that an area that satisfies the one or more criteria for multi-column balancing has a boundary with a height between 170 and 190 pixels, and thus can launch two multi-column layout generation modules 204 to generate trial layout boxes 216 having boundaries with heights between 170 and 190 pixels (e.g., one having a boundary with a height of 177 pixels, and the other having a boundary with a height of 184 pixels).

When multi-column controller 202 determines that a trial layout box 216 satisfies the one or more criteria for multi-column balancing, controller 202 can optionally terminate any multi-column layout generation modules 204 still generating a trial layout box 216. Similarly, when multi-column controller 202 determines that content overflows the area of a trial layout box 216, controller 202 can optionally terminate any multi-column layout generation modules 204 still generating a trial layout box 216 for an area having smaller boundaries than (e.g., a height less than) the boundaries of the area that was overflowed. Additionally, when multi-column controller 202 determines that content underflows the area of a trial layout box 216, controller 202 can optionally terminate any multi-column layout generation modules 204 still generating a trial layout box 216 for an area having larger boundaries than (e.g., a height greater than) the boundaries of the area that was underflowed.

Reusing element layouts refers to reusing element layouts generated as part of a trial layout in other trial layouts. As discussed above, each box builder 214 is an object that is responsible for building a particular type of element layout (also referred to as a line box) within layout box 216. These element layouts are included as part of layout box 216, and thus are stored in layout store 206. An association between the source content for an element and the element layout for that element in a layout box stored in layout store 206 is maintained (e.g., in layout store 206 or alternatively in another record or store). This association allows one or more element layouts for a particular element of the source content to be readily identified. This association can take a variety of different forms, such as maintaining for each element, an identifier of the element as well as identifiers of each associated element layout and each layout box including an associated element layout.

Each element layout is an object that includes various content or data, and also supports various functionality. A layout builder 212 can give an element layout a particular space within which the element layout is to be laid out, and query the element layout as to whether the element layout can be reused within the particular space. The element layout determines, and returns to layout builder 212 an indication of, whether the element layout can be reused within the particular space. If the element layout cannot be reused within the particular space, then layout builder 212 creates or activates an appropriate box builder 214 to build or generate the element layout in a layout box 216. However, if the element layout can be reused within the particular space, then layout builder 212 can reuse that element layout in layout box 216, adding the element to layout box 216 without creating or activating a box builder 214 to build the element layout in layout box 216.

The particular space that layout builder 212 provides to the element layout is based on the location of layout box 216 in which layout builder 212 desires to place the element layout. For example, referring to FIG. 4, assume that element layout C has been previously built and is stored in layout store 206. Layout builder 212 desires to locate element layout C below element layout B in the middle column of the multi-column layout. This location extending from just below element layout B to the end of the middle column is the particular space layout builder 212 provides to the element layout.

Whether the element layout can be reused within a particular space can be determined in various manners. In one or more embodiments, the element layout checks whether the height (e.g., in pixels) of the element layout is less than or equal to the height (e.g., in pixels) of the particular space. If the height of the element is not less than or equal to the height of the particular space then the element layout cannot be reused in the particular space. However, if the height of the element is less than or equal to the height of the particular space (and optionally other checks are satisfied), then the element layout can be reused in the particular space. Additionally, the element layout can check whether the element layout was fragmented (separated into multiple portions). If the element layout was fragmented, then the element layout cannot be reused in the particular space. However, if the element layout was not fragmented (and optionally other checks are satisfied) then the element layout can be reused in the particular space.

Although the element layout itself is discussed herein as determining whether the element layout will fit within a particular space, alternatively other components or modules can make the determination. For example, a layout builder 212 can make the determination based on metadata associated with the element layout (e.g., metadata indicating a height of the element layout, metadata indicating whether the element was fragmented, etc.). By way of another example, a box builder 214 can make the determination based on metadata associated with the element layout (e.g., metadata indicating a height of the element layout, metadata indicating whether the element was fragmented, etc.), and build or not build the element layout based on the result of the determination.

Fragmenting layouts refers to separating the content into multiple different portions, and generating trial layout boxes 216 for each of these different portions separately. The trial layout boxes 216 for the different portions can be generated in parallel using different multi-column layout generation modules 204, or alternatively consecutively (e.g., using the same multi-column layout generation module 204). The content is separated into different portions at a break point in the content, and the break point can be any point in the content (e.g., any arbitrary point identified by a multi-column layout generation module 204, any arbitrary point identified by multi-column controller 202, and so forth).

The break points can be, for example, locations in the content at which the type of content changes (e.g., text changes to images), locations in the content at which different pages are displayed (e.g., if the trial layout includes multiple pages, a break point can be located between each page), and so forth. The break points can also be locations at which a multi-column layout generation module 204 stops processing content. For example, when generating an element layout, a multi-column layout generation module 204 may encounter the end of a column in the multi-column layout being generated. In response, the multi-column layout generation module 204 stops processing the content and sets a break point at the location in the content where the module 204 stopped. The module 204 provides an indication of this break point to multi-column controller 202, allowing the multi-column controller 202 to have another multi-column layout generation module resume processing of the content at the break point. The indication can be provided in different manners, such as saving a record of the break point that is accessible to multi-column controller 202, invoking an application programming interface of multi-column controller 202, including an identification of the break point as metadata associated with the trial layout box 216, and so forth. Thus, an element layout for particular content or data can include multiple line boxes in multiple different columns.

Rendering partial layouts refers in part to rendering different portions of content separately, and allowing one portion to be rendered while attempts to identify a layout for another portion that satisfies the one or more criteria for multi-column balancing continue. The content can be separated into different portions at spanning items. A spanning item refers to a location in the content where some content or data would be displayed spanning across all of the columns of the multi-column layout. A spanning item can be various types of content or data itself, such as an image that is displayed, a button or other control that is displayed, and so forth. Because the spanning item spans all columns of the multi-column layout, the content above and below the spanning item is balanced separately. Accordingly, the two portions of content can be treated by multi-column controller 202 as different content for which multi-column layouts are generated.

Multi-column controller 202 can create or activate multi-column layout generation modules 204 to generate different trial layouts 216 for these different portions. In situations in which a balanced layout for one of the portions is generated before a balanced layout for the other portion is generated, the balanced layout for the one portion can be rendered before the balanced layout for the other portion. Multi-column controller 202 can continue the process of finding a balanced layout for the other portion, and then render that balanced layout for the other portion when found.

Rendering partial layouts also refers to rendering a trial layout 216 that is not a balanced layout. Multi-column controller 202 renders, as a partial layout, a trial layout 216 for content while continuing attempts to identify a trial layout 216 for that content that satisfies the one or more criteria for multi-column balancing continue. The trial layout 216 that multi-column controller 202 renders as a partial layout can be, for example, the trial layout 216 that most closely satisfies the one or more criteria for balancing the content across multiple columns (e.g., has the smallest amount of underflow or overflow). The partial layout can also be an incomplete layout (a layout for less than all of the content). By rendering a trial layout that is not a balanced layout, the content is rendered quickly even though not in a manner that satisfies the one or more criteria for balancing the content across multiple columns. However, multi-column 202 continues to attempt to identify a trial layout 216 that does satisfy the one or more criteria for balancing the content across multiple columns, and renders in place of the partial layout the trial layout 216 that does satisfy the one or more criteria for balancing the content across multiple columns when identified.

Figure 7:
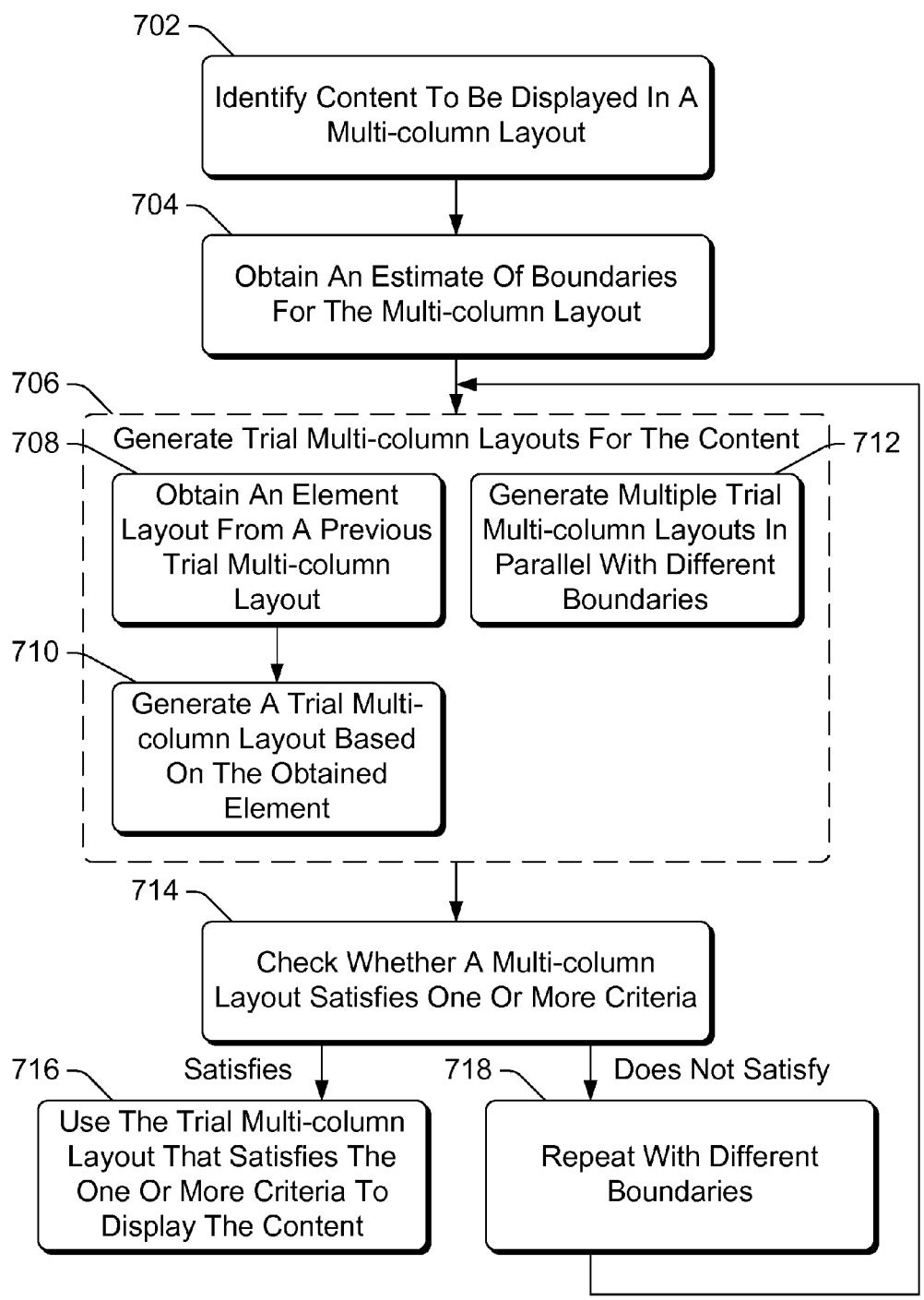
FIG. 7 is a flowchart illustrating an example process for implementing trial based multi-column balancing in accordance with one or more embodiments.

FIG. 7 is a flowchart illustrating an example process 700 for implementing trial based multi-column balancing in accordance with one or more embodiments. Process 700 is carried out by a device, such as computing device 102 of FIG. 1, and can be implemented in software, firmware, hardware, or combinations thereof. Process 700 is shown as a set of acts and is not limited to the order shown for performing the operations of the various acts. Process 700 is an example process for implementing trial based multi-column balancing; additional discussions of implementing trial based multi-column balancing are included herein with reference to different figures.

In process 700, content to be displayed in a multi-column layout is identified (act 702). The identified content is source content included in a structured document, such as an HTML document, that can include an indication of which content is to be included in the multi-column layout as discussed above.

An estimate of boundaries for the multi-column layout is obtained (act 704). This estimate can be generated in various manners as discussed above, such as by using boundaries from a previously generated balanced multi-column layout for the content if available, or being the height of a single-column layout for the content divided by the number of columns in the multi-column layout if a previously generated balanced multi-column layout for the content is not available.

One or more trial multi-column layouts for the content are generated (act 706), based at least in part on particular boundaries as discussed above. The estimate of boundaries from act 704 is initially used in generating the one or more trial multi-column layouts, and subsequent trial layouts are generated with different boundaries (act 718 discussed below). These layouts can be generated using various techniques, such as using parallelization, reusing element layouts, fragmenting layouts, and/or rendering partial layouts as discussed above. For example, an element layout from a previously generated trial multi-column layout can be obtained (act 708), and a trial multi-column layout generated based at least in part on the obtained element (act 710). By way of another example, multiple trial multi-column layouts can be generated in parallel with different boundaries (act 712).

A check is made as to whether a multi-column layout generated in act 706 satisfies one or more criteria (act 714). These one or more criteria comprise one or more criteria for balancing the content across multiple columns as discussed above.

If a multi-column layout satisfies the one or more criteria for multi-column balancing, then the multi-column layout that satisfies the one or more criteria is used to display the content (act 716). However, if none of the multi-column layouts satisfy the one or more criteria for multi-column balancing, then the generation and checking is repeated with different boundaries (act 718). These different boundaries can be determined in different manners as discussed above.

The trial based multi-column balancing techniques discussed herein support various usage scenarios. For example, multiple trial layouts can be generated in parallel, allowing a layout that satisfies the one or more criteria for multi-column balancing to be identified more quickly. Furthermore, element layouts from different trial layouts can be reused for subsequent layouts, freeing the trial based layout builder from needing to re-build or re-generate element layouts that have already been built. Additionally, element layouts can be fragmented at various break points, allowing multi-column layouts for the fragmented portions to be generated independently. In addition, content can be separated into multiple portions, and a multi-column layout generated for each of the multiple portions separately. The multi-column layouts for the different portions can be rendered as balanced multi-column layouts are identified, and each need not wait to be rendered until the balanced multi-column layout for the other is identified.

Figure 8:
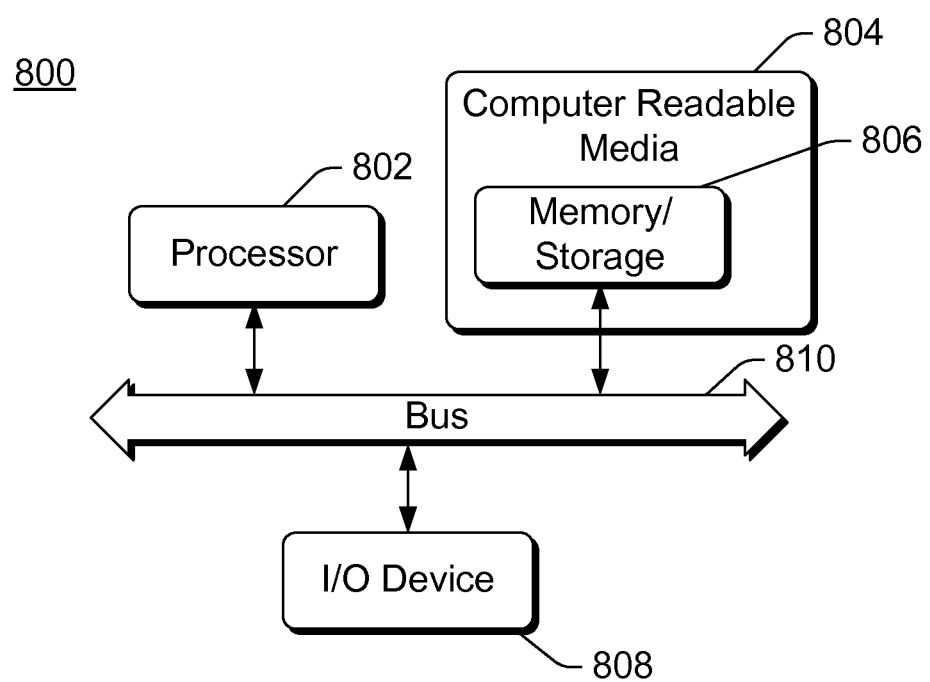
FIG. 8 illustrates an example computing device that can be configured to implement the trial based multi-column balancing in accordance with one or more embodiments.

FIG. 8 illustrates an example computing device 800 that can be configured to implement the trial based multi-column balancing in accordance with one or more embodiments. Computing device 800 can be, for example, computing device 102 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Processor 802, computer readable media 804, one or more of devices 808, and/or bus 810 can optionally be implemented as a single component or chip (e.g., a system on a chip). Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the trial based multi-column balancing techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
 identifying content to be displayed in a multi-column layout in a first area having boundaries, the content including multiple elements;
 obtaining, for each of at least one of the multiple elements, an element layout generated for a previous trial multi-column layout of the content;

generating a trial multi-column layout for the content based at least in part on the boundaries and the obtained at least one element layout;

checking whether the trial multi-column layout satisfies one or more criteria for balancing the content across multiple columns;

using, for displaying the content, the trial multi-column layout if the trial multi-column layout satisfies the one or more criteria; and repeating the obtaining, generating, and checking with areas having different boundaries if the trial multi-column layout does not satisfy the one or more criteria, the different boundaries being determined based at least in part on the previous trial multi-column layout of the content.

2. A method as recited in claim 1, the repeating comprising repeating the obtaining, generating, and checking with different boundaries until a trial multi-column layout does satisfy the one or more criteria.

3. A method as recited in claim 1, the areas having different boundaries comprising areas having larger heights than the first area if the trial multi-column layout overflows the first area.

4. A method as recited in claim 1, the areas having different boundaries comprising areas having smaller heights than the first area if the trial multi-column layout underflows the first area.

5. A method as recited in claim 1, further comprising maintaining a layout store in which generated trial multi-column layouts are stored and from which the element layout generated for the previous trial multi-column layout of the content is obtained.

6. A method as recited in claim 1, further comprising:
identifying a break point between a first portion and a second portion of the content; and
generating in parallel a first trial multi-column layout for the first portion and a second trial multi-column layout for the second portion.

7. A method as recited in claim 1, further comprising generating multiple trial multi-column layouts for the content in parallel, each of the multiple trial multi-column layouts being based at least in part on different boundaries relative to the boundaries in the first area.

8. A method as recited in claim 7, further comprising:
determining, as first boundaries, initial boundaries for the content;
using the first boundaries as boundaries of the first area;
increasing the initial boundaries by a particular amount to generate second boundaries;
using the second boundaries as boundaries of an area for one of the multiple trial multi-column layouts;
decreasing the initial boundaries by another particular amount to generate third boundaries; and
using the third boundaries as boundaries of another area for one of the multiple trial multi-column layouts.

9. A method as recited in claim 1, further comprising:
identifying a spanning item that separates the content into a first portion and a second portion; and
displaying a multi-column layout for the first portion while continuing to generate a trial multi-column layout for the second portion.

10. A method as recited in claim 1, the one or more criteria comprising both the content of the trial multi-column layout not overflowing the area and the content of the trial multi-column layout not underflowing the area by more than a threshold amount.

11. A method as recited in claim 1, the content comprising source content in an HTML document.

12. A computing device comprising:
one or more processors; and one or more computer storage media having stored thereon multiple instructions that, when executed by the one or more processors of the computing device, cause the one or more processors to perform acts comprising:
identifying content to be displayed in a multi-column layout in an area, the content including multiple elements;
obtaining, for each of at least one of the multiple elements, an element layout generated for a previous trial multi-column layout of the content;
generating a first trial multi-column layout for the content based at least in part on first boundaries and the obtained at least one element layout, and a second trial multi-column layout for the content based at least in part on second boundaries and the obtained at least one element layout, the first and second boundaries being different boundaries;
checking whether the first trial multi-column layout or the second trial multi-column layout satisfies one or more criteria;
using, to display the content in the area, the one of the first trial multi-column layout or the second trial multi-column layout that satisfies the one or more criteria if the first trial multi-column layout or second trial multi-column layout satisfies the one or more criteria; and
repeating the generating and checking with different boundaries if neither the first trial multi-column layout nor the second trial multi-column layout satisfies the one or more criteria.

13. A computing device as recited in claim 12, the repeating comprising repeating the generating and checking with areas having different boundaries until a trial multi-column layout does satisfy the one or more criteria.

14. A computing device as recited in claim 13, the areas having different boundaries comprising areas having larger heights than the area if the trial multi-column layout overflows the area, and the areas having different boundaries comprising areas having smaller heights than the area if the trial multi-column layout underflows the area.

15. A computing device as recited in claim 12, the acts further comprising generating a result value for the first trial multi-column layout, the result value indicating whether the first trial multi-column layout underflows or overflows the area of the first trial multi-column layout.

16. A computing device as recited in claim 12, the acts further comprising maintaining a layout store in which generated trial multi-column layouts are stored and from which the element layout generated for the previous trial multi-column layout of the content is obtained.

17. A computing device as recited in claim 12, the acts further comprising:
identifying a break point that separates the content into a first portion and a second portion; and
generating in parallel a first trial multi-column layout for the first portion and a second trial multi-column layout for the second portion.

18. A computing device as recited in claim 12, further comprising:
identifying a spanning item that separates the content into a first portion and a second portion; and displaying a trial multi-column layout for the first portion while continuing to generate a trial multi-column layout for the second portion.

19. A computing device as recited in claim 12, the one or more criteria comprising both the content of a trial multi-column layout not overflowing an area of the trial multi-column layout and the content of the trial multi-column layout not underflowing the area of the trial multi-column layout by more than a threshold amount.

20. A method comprising:
- identifying content to be displayed in a multi-column layout in an area having boundaries, the content including multiple elements;
- obtaining, for each of at least one of the multiple elements, an element layout generated for a previous trial multi-column layout of the content;
- generating multiple trial multi-column layouts for the content in parallel, each of the multiple trial multi-column layouts being based at least in part on different boundaries, and one or more of the multiple trial multi-column layouts being based at least in part on the obtained at least one element layout;
- checking whether one of the multiple trial multi-column layouts satisfies one or more criteria, the one or more criteria comprising both the content of a trial multi-column layout not overflowing an area of the trial multi-column layout and the content of the trial multi-column layout not underflowing the area of the trial multi-column layout by more than a threshold amount;
- generating a result value for each of the multiple trial multi-column layouts, the result value indicating whether the trial multi-column layout underflows or overflows the area of the trial multi-column layout;
- using, for displaying the content, one of the trial multi-column layouts that satisfies the one or more criteria; and
- repeating the obtaining, generating, and checking with different boundaries if in response to none of the trial multi-column layouts satisfying the one or more criteria, the different boundaries being determined based at least in part on the resulting values.

\* \* \* \* \*